US005236159A

United States Patent [19]

Avnery et al.

[11] Patent Number: 5,236,159

[45] Date of Patent: Aug. 17, 1993

[54] FILAMENT CLIP SUPPORT

[75] Inventors: Tzvi Avnery, Winchester; Rolfe W. Graham, Woburn, both of Mass.

[73] Assignee: Energy Sciences Inc., Wilmington, Mass.

[21] Appl. No.: 815,813

[22] Filed: Dec. 30, 1991

[51] Int. Cl.$^5$ .................................... F16L 3/08

[52] U.S. Cl. .................................... 248/74.2; 313/271

[58] Field of Search .................... 248/74.2, 62; 313/271, 313/272, 273, 222, 115, 237

[56] References Cited

U.S. PATENT DOCUMENTS

| | | | |
|---|---|---|---|
| 466,932 | 1/1892 | Cornell | 248/74.2 X |
| 1,081,072 | 12/1913 | Wilbur | 313/272 |
| 2,380,502 | 7/1945 | Clark | 313/273 X |
| 2,615,137 | 10/1952 | Duke | 313/273 X |
| 2,657,442 | 11/1953 | Bedford | 248/74.2 |
| 3,437,298 | 4/1969 | Seckerson | 248/74.2 X |
| 3,465,401 | 9/1969 | Lowery | 313/272 X |
| 3,702,412 | 11/1972 | Quintal | 313/299 |
| 3,749,967 | 7/1973 | Douglas et al. | 315/85 |
| 3,863,163 | 1/1975 | Farrell et al. | 328/233 |
| 4,100,450 | 7/1978 | Frutiger et al. | 313/360 |

FOREIGN PATENT DOCUMENTS

| | | | |
|---|---|---|---|
| 121983 | 8/1946 | Australia | 313/271 |

*Primary Examiner*—J. Franklin Foss
*Attorney, Agent, or Firm*—Rines and Rines, Shapiro and Shapiro

[57] ABSTRACT

A novel heatable filament wire support is provided embodying flexible and rigid support and current-providing bracket beams terminating in inherent resilient clip springs for accurately clamping the ends of the filament with mechanical and electrical reliability, enabling facile filament wire alignment and replacement, and accommodation for thermal displacement upon filament heating.

21 Claims, 5 Drawing Sheets

FILAMENT CLIP SUPPORT

The present invention relates to electron beam gun structures for such purposes as treating or irradiating electron beam curable coatings and inks, and surface sterilization and related applications, x-ray generating equipment, vacuum tube, and other hot filament instrumentation, being more particularly directed to the filament structures therefor and their supports.

BACKGROUND OF INVENTION

The art is replete in many areas of electron beam generation with directly heated filament electron beam sources of varied configurations. Single filament guns particularly suited for such electron beam irradiating applications are described, for example, in U.S. Pat. Nos. 3,702,412 and 4,100,450 of common assignee herewith, and are embodied in Energy Sciences Inc., Type ESI Gun apparatus. Multi, including parallel, filament constructions have also been proposed as in, for example, U.S. Pat. No., 3,749,967 and 3,863,163. In these, as in other vacuum tube applications, including also x-ray generating equipment, a wide variety of heated filament support structures have been used, many of permanent nature, requiring total replacement upon the burning out of or damage to the filament, and others capable of disassembly for filament wire replacement, though generally complicated and time consuming. Such uses of directly heated filaments, typically operating at temperatures in excess of 2000° C., have required different types of mechanical support and electrical terminations for the filaments, depending upon space, dimension and specific application considerations. In addition to the replacement problem above described, additional typical problems with existing filament structures and terminations are: high cost, difficulty in alignment, low reliability, adaptibility for large dimension structures.

The problem, however, of providing a universal, efficient, simple and reliable heated filament support construction that improves reliability and ease of assembly and maintenance, and more particularly that readily can accommodate up-and-down sizing in filament length and facile filament replacement, has, until the present invention, lingered in this art for many decades.

In accordance with the present invention, a novel filament support and spring clipping technique is provided, particularly though by no means exclusively adapted for use in alined multi-filament cathodes and the like, as well, as described in copending U.S. patent application of common assignee Ser. No. 796,479, filed Nov. 22, 1991, for Improved Parallel Filament Electron Gun.

OBJECTS OF INVENTION

It is thus an object of the present invention to provide a new and improved filament support that obviates the above disadvantages and, to the contrary, enables ease of installation and maintenance, lower cost, improved reliability and consistency, all while maintaining or improving the performance of the equipment and providing a technique for supported heated filaments of a wide variety of sizes, including enabling their ready replacement.

A further object is to provide a novel filament clip support structure of universal use in many different types of heated filament equipments.

Other and further objects will be explained hereinafter and are more particularly pointed out in the appended claims.

SUMMARY

In summary, the invention embraces an electron gun heatable filament wire support comprising a longitudinally extending bracket beam having means at one end for mounting upon a support structure and carrying resilient clip spring means extending transversely of the beam at its other end; the clip spring means being of generally U-shaped form with one arm fixedly and transversely extending from the beam at said other end and provided with aperture means, rearward opposing transverse sides of which are provided with filament-aligning groove means; and the other arm of the clip spring means being free and terminating in a tongue resiliently compressible through the front of said aperture means upon compression of the said other arm such that, when a transversely extending filament wire is placed along the rearward aperture groove means, the release of the said other arm of the clip spring means will cause said tongue to clamp the filament across the rear of the aperture within said groove means.

From the viewpoint of a total filament support structure, the invention also provides an electron gun heatable filament wire support assembly having, in combination, a pair of transversely spaced mounting supports between which a filament is to be mounted, and a pair of similar downwardly extending bracket beams each mounted at one end upon a corresponding support of the pair of supports in transverse alignment; each beam carrying at its other end a transversely inwardly extending resilient clip spring of generally U-shaped form with one arm fixedly and transversely inwardly extending from the beam at the other end thereof and provided with aperture means; the said other arm of each clip spring being free and terminating in a tongue resiliently compressible through the corresponding aperture means upon compression of each of the said other arms, such that, when a transversely extending filament wire is placed between the beams alined with the outer surfaces of the respective aperture means thereof, the compressed other arms of each of the clip springs will cause their respective tongues, upon release, to clamp the opposite ends of the filament across and against the corresponding aperture means and beams to mount the filament.

The invention thus provides mechanical support, electrical connection, and a provision for filament displacement due to thermal expansion. The preferred thin type beam (strip) that is machined and bent to create the mechanical support is provided with an alignment pin hole and mounting screw, enabling the electrical connection. The resilient mechanical type clipping has protection against over-compression and positive filament alignment positioning grooves.

Best mode and preferred designs are hereinafter set forth in detail.

DRAWINGS

The invention will now be described in connection with accompanying drawings,

FIG. 1 of which is an isometric view of the flexible beam-clip support of the invention in open position;

DESCRIPTION OF PREFERRED EMBODIMENTS(S) OF INVENTION

Figure 1:
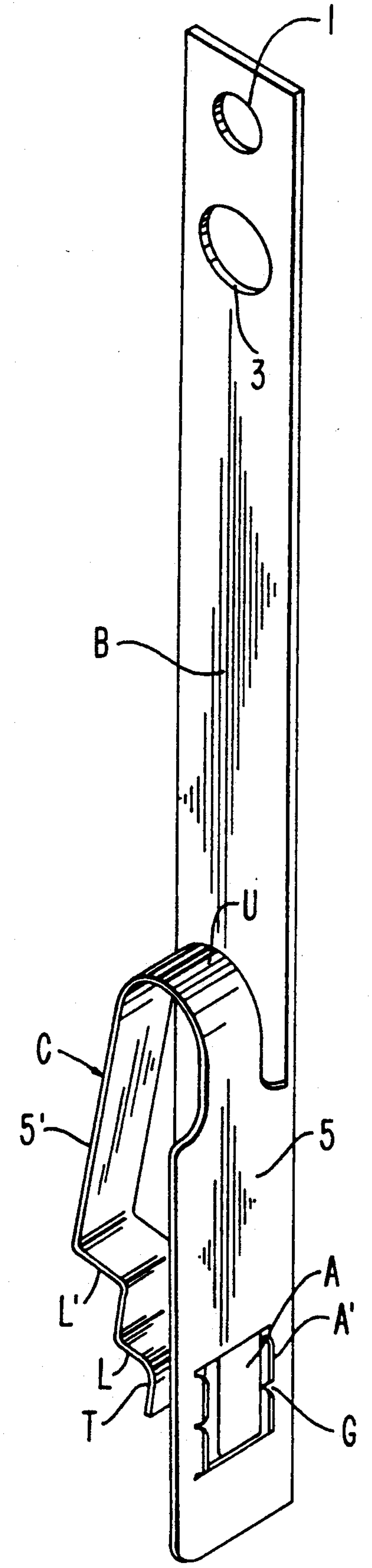

Referring to FIG. 1, a filament wire support constructed in accordance with the invention is shown in preferred form, fabricated of sheet metal to conduct the electric current for heating the filament, and having basically two parts:

a. a flexible planar bracket beam B that provides the mechanical support and allows much needed displacement as the filament rises in temperature from ambient to typically over 2000° C., as later explained; and b. a resilient clip spring C that holds the filament.

The flexible planar bracket beam B has at its upper end an alignment hole 1 to be used with an alignment pin P during assembly, as hereinafter described in connection with the support assembly of FIGS. 5A and 5B, and a mounting hole 3 to secure the entire clip support to the equipment support body. The thickness and width of the sheet metal support B–C is designed for flexibility based on the specific material for th specific filament application since the force on the filament at high temperature is critical.

The opposite or lower end of the flexible beam B, shown vertically longitudinally oriented in FIG. 1, has a rigidized section serving as a fixed arm 5 of the clip C, and formed preferably by bending the beam sheet material at right angles transversely inwardly at 5. At the top, the width is reduced and bent over in U-shaped fashion, as at U, into the resilient arm 5′ of the clip spring, extending in open position at an acute angle to the plane of the fixed arm 5. The arm 5′ terminates, after a lower L-shaped bend, in a tongue T that, when the clip spring is compressed, may pass through a lower preferably rectangular aperture A at the bottom end of the arm 5.

Figure 2:
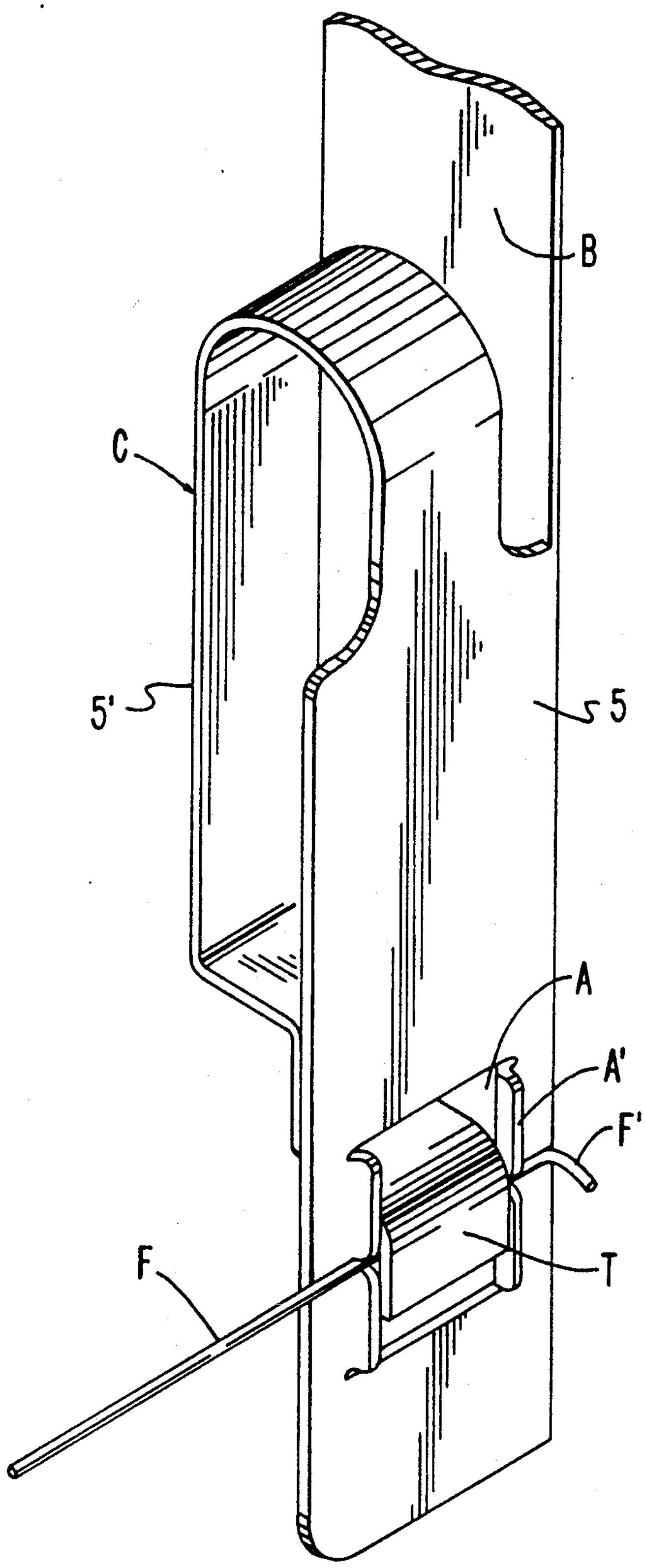
FIG. 2 is an isometric view, upon a somewhat larger scale, of the flexible clip support in closed position with the filament clamped therein.
Figure 3:
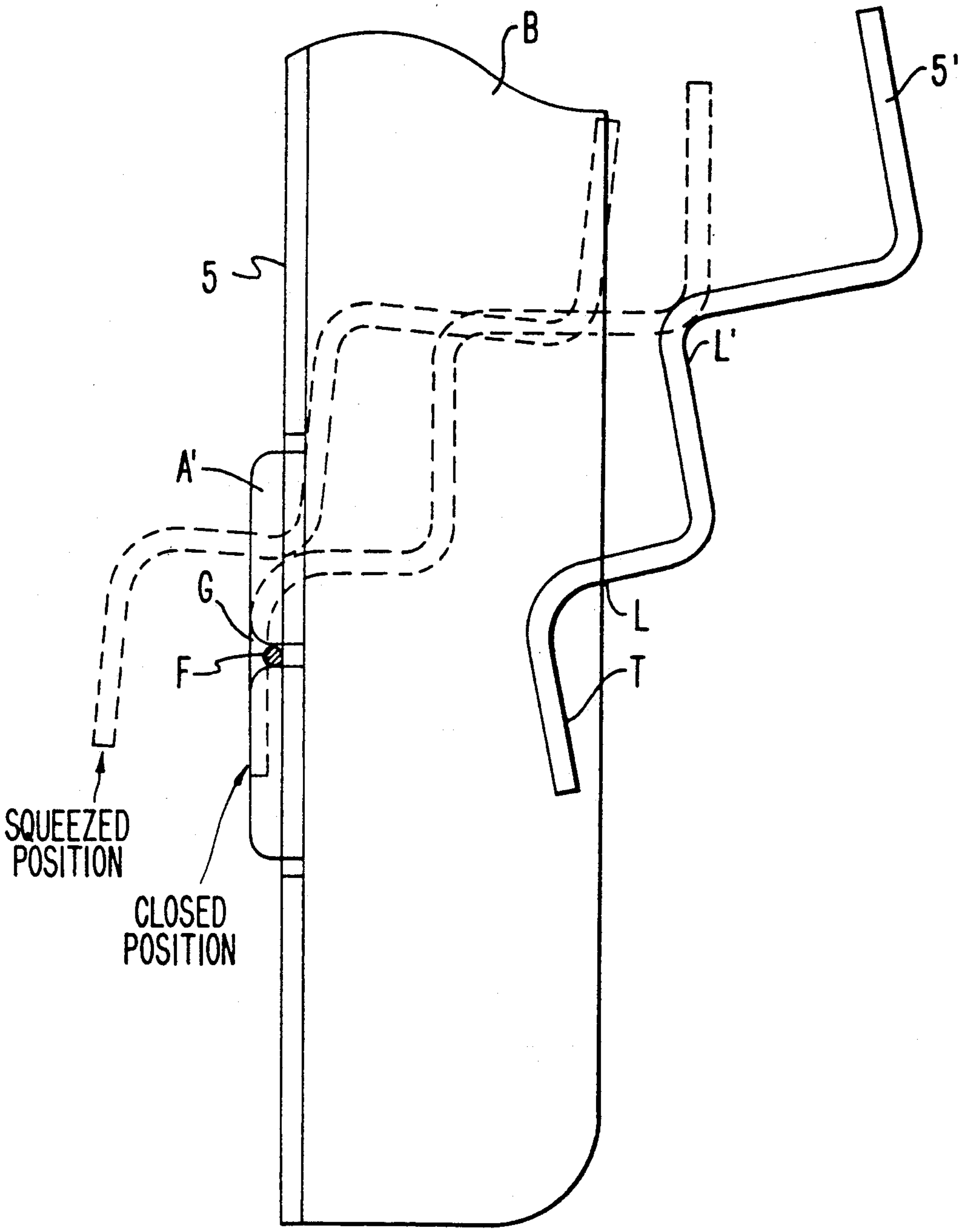
FIG. 3 is a side view of the flexible clip support in open and closed positions.

The opposing side edges A′ of the aperture A are shown rearwardly or outwardly extended (bent) and intermediately notched or grooved at G, preferably mid-way, to serve as alignment grooves for an end of the filament F to be clipped or clamped by the tongue T, as shown in FIGS. 2 and 3. The solid lines show the open clip position in FIG. 3, corresponding to FIG. 1, and the left-most dash lines, labelled "Squeezed Position", show the compressing of the resilient arm 5′ of the clip to push the tongue T through the aperture A. With the filament F inserted in the transversely aligned grooves G, the compressed clip arm 5′ is released and the tongue T snaps against the filament F, mechanically clamping or clipping the same in place in the grooves across the aperture A against the fixed clamp arm 5 thereat—shown by the intermediate dash lines labelled "Closed Position". In addition to accurate and secure mechanical clamping, this construction enables excellent electrical contact of the filament to the beam B.

To prevent over-compression or over-bending of the clamp spring, an L-shaped step L′ is formed above the tongue step L, to protect against over-bending that may cause weakening or collapse of the spring, such being shown by the engagement against the upper edge of the aperture A in the left-most dash-line position of FIG. 3.

As later described in connection with the embodiment of FIGS. 5A and 5B, a pair of transversely spaced and aligned beam clips B–C will support the filament between its clamped or clipped ends. The clipping or clamping tongue T is shown constructed in flat shape to allow for the self-alignment of the filament F in the alignment grooves G and to provide a very rigid electrical connection for the filament end. Because of the hot temperature developed in this environment, this design for clipping or clamping the filament end provides a large surface area that effectively radiates the heat. With such a relatively large radiating area, the clipping device remains at a relatively low temperature, obviating the need for clamping screws and appropriate tools as in the prior art. There is, furthermore, no need for special high temperature terminations on the ends of the filament, such as tantalum sleeves and the like required in prior systems, and the filament end can be used bare.

The design of the invention, furthermore, allows a rapid replacement of filaments during initial assembly and routine maintenance, with no need for tedious threading and critical alignment of the fragile filaments, as heretofore required, and also no need for tools. A maintenance person simply squeezes or compresses the clip, slides the filament in a parallel movement, and releases the clip. The filament clip support ensures the accurate alignment of the filament to the equipment body through the alignment pin hole 1 and the alignment grooves G. In desired, the actual end of the filament may be transversely bent as at F′, FIG. 2. In applications where there are multiple filaments, as in said copending application, this arrangement ensures proper alignment of all the filaments to one other and to the main equipment support body.

Figure 4:
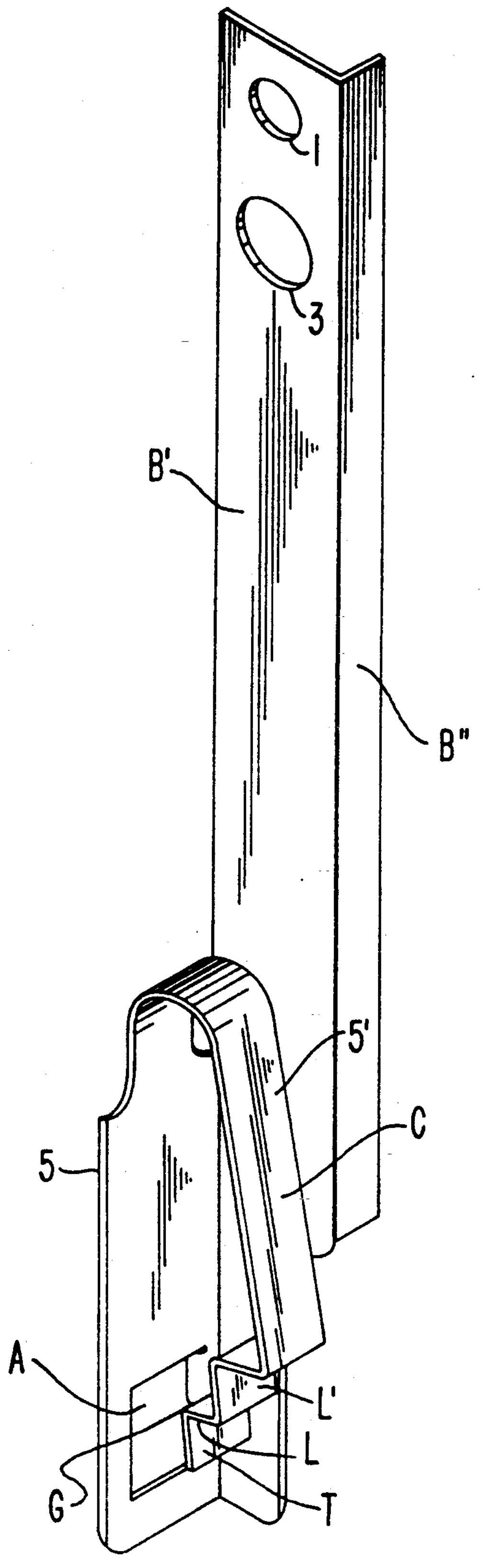
FIG. 4 is an isometric view of the rigid clip support in the open position.

It will be noted, moreover, that the flexibility of the beam B will allow for thermal expansion as the filament is heated. Some applications, however, may require one end of the filament to be rigid. This is superior for applications where multi-filaments are used and the alignment of the filaments to one other is critical. Thus, in FIG. 4, a beam-clip structure B′–C is shown, similar to that of FIGS. 1–3, but with the bracket beam B′ stiffened by the right-angular bend B″. In such a configuration, however, the other end of the filament should be flexible, as in the structure B–C of FIG. 1, to provide the much-needed thermal displacement.

Figure 5A:
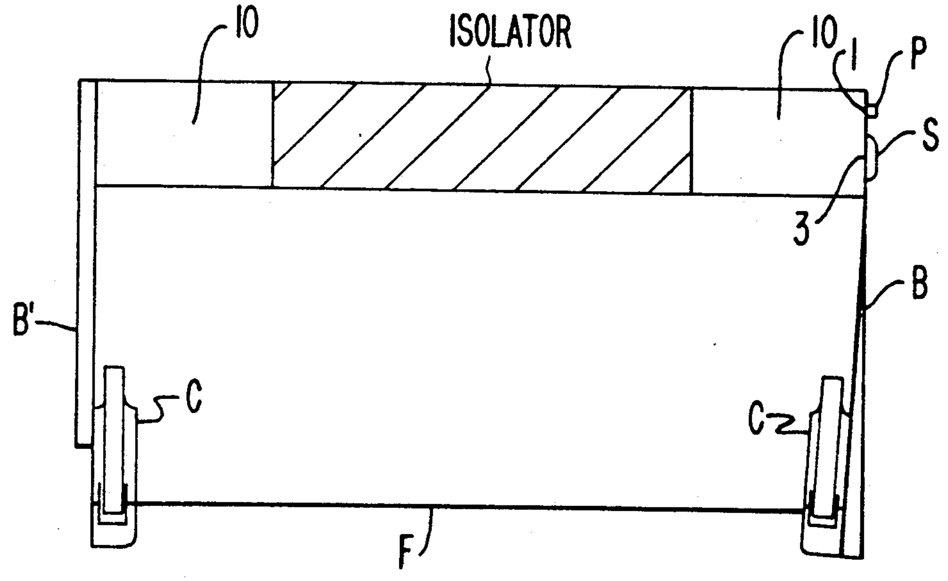
FIGS. 5A and 5B are side views of a typical assembly application in cold and hot filament conditions.
Figure 5B:
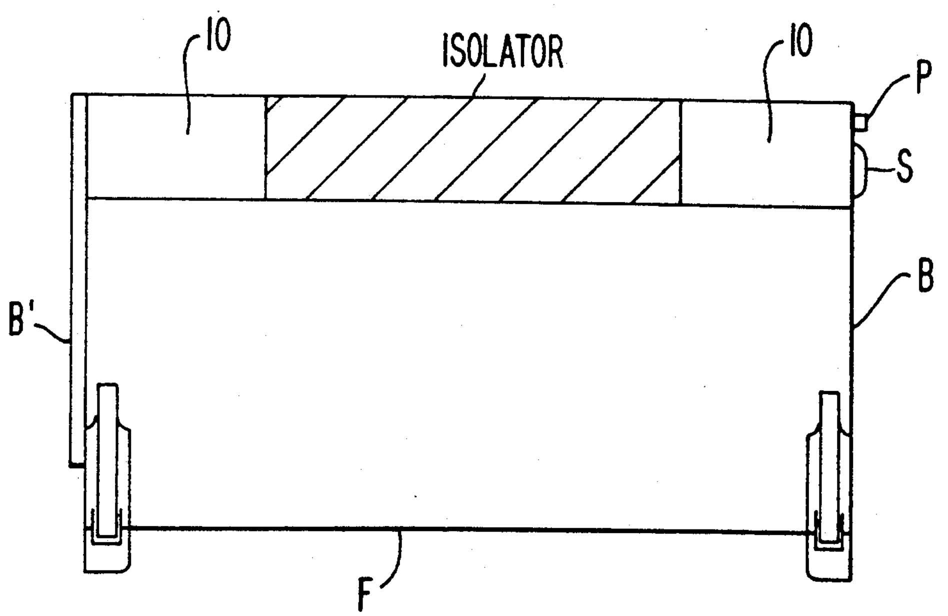

Such a filament supporting assembly is shown in the before-mentioned FIGS. 5A and 5B, respectively showing cold and heated filament conditions. The upper support body for the transversely spaced rigid beam-clip B′–C (to left) the flexible beam-clip B–C (to right) is shown as a pair of parallel spaced bus bars 10 to the outer sides of which the respective beam-clips are mounted by screws S and algined by the before-described pins P.

With the present invention, thus, universal filament supporting is provided with rigid, precise alignment positioning, reliable electrical connection, flexibility for thermal displacement, bare filament terminations, rapid filament replacement and inherent connection to the filament current bus.

Further modifications will occur to those skilled in this art and such are considered to fall within the spirit and scope of the invention as defined in the appended claims.

What is claimed is:

1. An electron gun heatable filament wire support comprising a longitudinally extending bracket beam having means at one end for mounting upon a support structure and carrying resilient clip spring means extending transversely of the beam at its other end; the clip spring means being of generally U-shaped form with one arm fixedly and transversely extending from the beam at said other end and provided with aperture means, rearward opposing transverse sides of which are provided with filament-aligning groove means; and the other arm of the clip spring means being free and terminating in a tongue resiliently compressible through the front of said aperture means upon compression of the said other arm such that, when a transversely extending filament wire is placed along the rearward aperture groove means, the release of the said other arm of the clip spring means will cause said tongue to clamp the filament across the rear of the aperture means within said groove means.

2. A filament wire support as claimed in claim 1 and in which said bracket beam is flexible.

3. A filament wire support as claimed in claim 1 and in which said bracket beam is stiffened to be rigid.

4. A filament wire support as claimed in claim 1 and in which said other free arm of the clip spring means is provided with a pair of successive inwardly formed steps, the first of which extends partially above the aperture means to serve as a protection step to prevent over-bending, and the second of which terminates in said tongue, compressible through the aperture means.

5. A filament wire support as claimed in claim 4 and in which the successive steps of said pair of steps are of L-shape.

6. A filament wire support as claimed in claim 1 and in which said longitudinally extending bracket beam and said tranversely extending clip spring means are of sheet strip material, the bracket beam being planar, and the said one arm of the clip spring means extending in a plane at right angles to that of the beam, with the said other arm, when uncompressed, forming an acute angle with respect to the plane of said one arm.

7. A filament wire support as claimed in claim 6 and in which said one arm of the clip spring means comprises a right-angle bend of the strip material of the bracket beam at its said other end.

8. A filament wire support as claimed in claim 7 and in which the said other arm of the clip spring means and the neck of the U-shaped connection to the said one arm thereof is of width less than that of the said one arm.

9. A filament wire support as claimed in claim 1 and in which the means for mounting the bracket beam upon a support structure comprises a mounting hole for receiving a mounting insert such as a screw, and a further hole for receiving a pin to align the bracket.

10. A filament wire support as claimed in claim 1 and in which said rearward aperture groove means comprises rearwardly extending opposing side edges of the aperture means, provided with transversely aligned notches comprising said aperture groove means.

11. A filament wire support as claimed in claim 10 and in which said aperture means is rectangular and said notches are substantially midway along said side edges.

12. An electron gun heatable filament wire support comprising a sheet metal planar longitudinally extending bracket beam having mounting means at one end and bent transversely at right angles to the plane thereof at the other end to form a fixed arm of a clip spring, the other and free arm of the clip spring being bent downwardly from the top of the fixed arm in U-shaped form and at an acute angle to the fixed arm, said free arm terminating in a tongue end being resiliently compressible toward the fixed arm, and an aperture provided near the bottom of the fixed arm for receiving the compressed tongue of the free arm and permitting the passage of the same therethrough.

13. A filament wire support as claimed in claim 12 and in which said free arm is provided with a pair of successively inwardly bent steps, the first of which serves as a protection from over-compressing said free arm and the second of which compresses said tongue.

14. A filament wire support as claimed in claim 13 and in which the said aperture of the fixed arm is provided with rearwardly extending opposing side edges provided with transversely aligned notches.

15. A filament wire support as claimed in claim 12 and in which said mounting means comprises mounting screw aperture means, and said bracket beam is one of flexible for resiliency and stiffened for rigidity.

16. A filament as claimed in claim 15 and in which said bracket beam is provided at said one end with alignment aperture means.

17. An electron gun heatable filament wire support assembly having, in combination, a pair of transversely spaced mounting supports between which a filament is to be mounted, and a pair of similar downwardly extending bracket beams each mounted at one end upon a corresponding support of the pair of supports in transverse alignment; each beam carrying at its other end a transversely inwardly extending resilient clip spring of generally U-shaped form with one arm fixedly and transversely inwardly extending from the beam at the other end thereof and provided with aperture means; the said other arm of each clip spring being free and terminating in a tongue resiliently compressible through the corresponding aperture means upon compression of each of the said other arms, such that, when a transversely extending filament wire is placed between the beams alined with the outer surfaces of the respective aperture means thereof, the compressed other arms of each of the clip springs will cause their respective tongues, upon release, to clamp the opposite ends of the filament across and against the corresponding aperture means and beams to mount the filament.

18. A filament wire support assembly as claimed in claim 17 and in which each of the mounting supports comprises an electrical bus and said beams and clip springs are conductive to enable electrical powering of the mounted filament.

19. A filament wire support assembly as claimed in claim 17 and in which each of the beam aperture means is provided outwardly with groove means along which the respective ends of the filament wire are clamped by the respective released tongues of the clip springs.

20. A filament wire support assembly as claimed in claim 19 and in which one of the bracket beams is stiffened to provide a rigid support and the other is flexible to permit preloading when the filament is cold and thermal extension outward in response to the temperature rise in powering the filament wire to operating alignment.

21. A filament wire support assembly as claimed in claim 20 and in which the ends of the filament wire are transversely bent.

* * * * *